(12) United States Patent
Lyons

(10) Patent No.: US 8,383,028 B2
(45) Date of Patent: Feb. 26, 2013

(54) METHOD OF MANUFACTURING CO-MOLDED INSERTS

(75) Inventor: Brett I. Lyons, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 644 days.

(21) Appl. No.: 12/270,227

(22) Filed: Nov. 13, 2008

(65) Prior Publication Data

US 2010/0121475 A1 May 13, 2010

(51) Int. Cl.
*B29B 13/00* (2006.01)

(52) U.S. Cl. ............... 264/271.1; 264/497; 264/274; 156/250

(58) Field of Classification Search ............ 264/497, 264/271.1, 274
See application file for complete search history.

(56) References Cited

U.S. PATENT DOCUMENTS

| 3,746,489 A * | 7/1973 | Rizzi et al. ............... 425/205 |
| 4,938,816 A | 7/1990 | Beaman et al. |
| 5,121,329 A | 6/1992 | Crump |
| 5,204,055 A | 4/1993 | Sachs et al. |
| 5,259,901 A | 11/1993 | Davis et al. |
| 6,630,093 B1 * | 10/2003 | Jones ............... 264/401 |
| 6,828,373 B2 | 12/2004 | Artz et al. |
| 2003/0211265 A1 * | 11/2003 | Balbaugh et al. ............ 428/36.9 |
| 2004/0048027 A1 | 3/2004 | Hayes et al. |
| 2005/0278061 A1 | 12/2005 | DeGrange et al. |
| 2007/0208447 A1 | 9/2007 | Ostrega |
| 2007/0236018 A1 * | 10/2007 | Husmann et al. ............ 285/401 |

FOREIGN PATENT DOCUMENTS

WO 2007138619 A1 12/2007

OTHER PUBLICATIONS

International Search Report and the Written Opinion of the International Searching Authority, Mailed May 18, 2010, for PCT/US2009/063973, 13 pages.

* cited by examiner

*Primary Examiner* — Galen Hauth

(57) ABSTRACT

A method for manufacturing a co-molded insert part for use in composite, plastic, or metal parts is disclosed. The method comprises the step of providing a three-dimensional molding insert produced by a layer additive manufacturing process. The method further comprises the step of applying a layer material in contact with at least a portion of the molding insert. The method further comprises the step of co-molding the layer material and the molding insert simultaneously to produce a co-molded insert part.

18 Claims, 7 Drawing Sheets

METHOD OF MANUFACTURING CO-MOLDED INSERTS

BACKGROUND

1) Field of the Disclosure

The disclosure relates to a method of manufacturing co-molded inserts. In particular, the disclosure relates to a method of manufacturing co-molded inserts for use in composite, plastic, and metal parts using additive manufacturing.

2) Description of Related Art

Composite, plastic, and metal parts can be used in the manufacture of spacecraft, aircraft, military craft, automobiles, watercraft, and other vehicles and craft. Creating geometrically complex, high performance, three-dimensional composite, plastic, or metal parts typically requires multiple sets of tooling and molding operations. Such composite, plastic, or metal parts also typically require assembly with molded inserts made of other materials for joining or system integration, such as wiring or hydraulic brackets. Known methods and systems for making such molded or assembled inserts may require molding, forming, casting, tooling, and/or curing operations, as well as machining tools and fixtures to create such inserts, and this can be costly and require significant production lead time. Moreover, molded inserts for use in fiber reinforced plastic parts are normally made individually, thus requiring a large number of parts and associated logistics. Known methods and systems may require individually molded or machined inserts to be assembled piecemeal, which can introduce precision errors and can result in increased labor costs. In addition, known methods for manually assembling molded or co-molded inserts can lack precision, as the precise assembly of such inserts typically requires fixtures, jigs, or laser projection type guides to position, place, and bond such inserts to the plastic part precisely. Often the creation of a three-dimensional composite assembly with molded or co-molded inserts, such as nutplates, can require multiple molding or bonding cure cycles. The use of such fixtures for precise assembly can be costly and time consuming. In addition, known methods and systems can impose geometric limitations on the design of such molded or co-molded inserts.

Accordingly, there is a need for a method of manufacturing co-molded inserts that provides advantages over known methods and systems.

SUMMARY

This need for a method of manufacturing co-molded inserts is satisfied. None of the known methods and systems provide all of the numerous advantages discussed herein. Unlike known methods and systems, embodiments of the method of the disclosure may provide one or more of the following advantages: provides a method that uses additive manufacturing to create co-molded inserts for use in composite, plastic, or metal parts; provides a method that allows for co-molded inserts to be created with little or no associated tooling costs or lead time, with reduced costs due to less materials used, with reduced labor time and costs for insert placement, with reduced scrap through higher insert placement precision, and with reduced costs to manufacture inserts in low volumes; provides a method that allows for more advanced, three-dimensional designs of greater geometric complexity to be created with higher precision due to the free form nature of additive manufacturing of inserts; provides a method that creates co-molded inserts in useful materials, such as titanium alloys, thermoplastics, thermoset plastics, and other suitable materials, for use as subcomponents in fiber reinforced or thermoformed plastic parts; provides a method that reduces or eliminates molding, forming, tooling, curing, or machining tools and fixtures to create inserts; provides a method that does not require jigs, fixtures, or laser projection type guides for precise placement of inserts; provides a method that combines multiple parts and inserts into a single, self-positioning piece or unit with minimal connecting geometry to allow for precise placement with low labor requirements; provides a method that improves mechanical performance; provides a method that produces inserts and hardware via a tool-less process to avoid supply chain delays, as parts can be made on demand, in low quantities; provides a method for making co-molded inserts of an integrated design that can lower vehicle weight and can increase assembly accuracy which, in turn, can contribute to better product performance; and provides a method for making composite, plastic, and metal parts having co-molded inserts for use in spacecraft, aircraft, military craft, automobiles, watercraft, and other vehicles and craft.

In an embodiment of the disclosure, a method for making a co-molded insert part for use in composite, plastic, or metal parts is disclosed. The method comprises the step of providing a three-dimensional molding insert produced by a layer additive manufacturing process. The method further comprises the step of applying a layer material in contact with at least a portion of the molding insert. The method further comprises the step of co-molding the layer material and the molding insert simultaneously to produce a co-molded insert part.

In another embodiment of the disclosure, a method for additive manufacturing of a co-molded insert part is disclosed. The method comprises the step of creating with a computer aided design software a three-dimensional computer rendering of an insert part. The method further comprises the step of transferring the computer rendered insert part to an additive manufacturing machine software to build the insert part. The method further comprises the steps of building the insert part with an additive manufacturing process, assembling the insert part with a layer material in a mold, co-molding the insert part and the material in the mold to form a co-molded insert part, and curing the co-molded insert part. The method further comprises the steps of removing the co-molded insert part from the mold and finishing and post-processing the co-molded insert part.

In another embodiment of the disclosure, a method of manufacturing composite parts having co-molded inserts is disclosed. Three-dimensional computer aided design software is transferred to additive manufacturing machine software. Processed geometry data and a molding insert producing device forms in a layer-wise fashion, followed by post-processing and inserting the molding insert into a mold.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The method of the disclosed embodiments uses additive manufacturing (AM) technology to make co-molded inserts for use in composite, plastic, and metal part manufacturing or on reinforced or monolithic polymeric parts. The method of the disclosed embodiments may be used for making composite, plastic, and metal parts having co-molded inserts for use in spacecraft, aircraft, military craft, automobiles, watercraft, and other vehicles and craft. Accordingly, one of ordinary skill in the art will recognize and appreciate that the method of the disclosure can be used in any number of applications involving the manufacture of co-molded inserts for use in composite, plastic, and metal parts.

Figure 1:
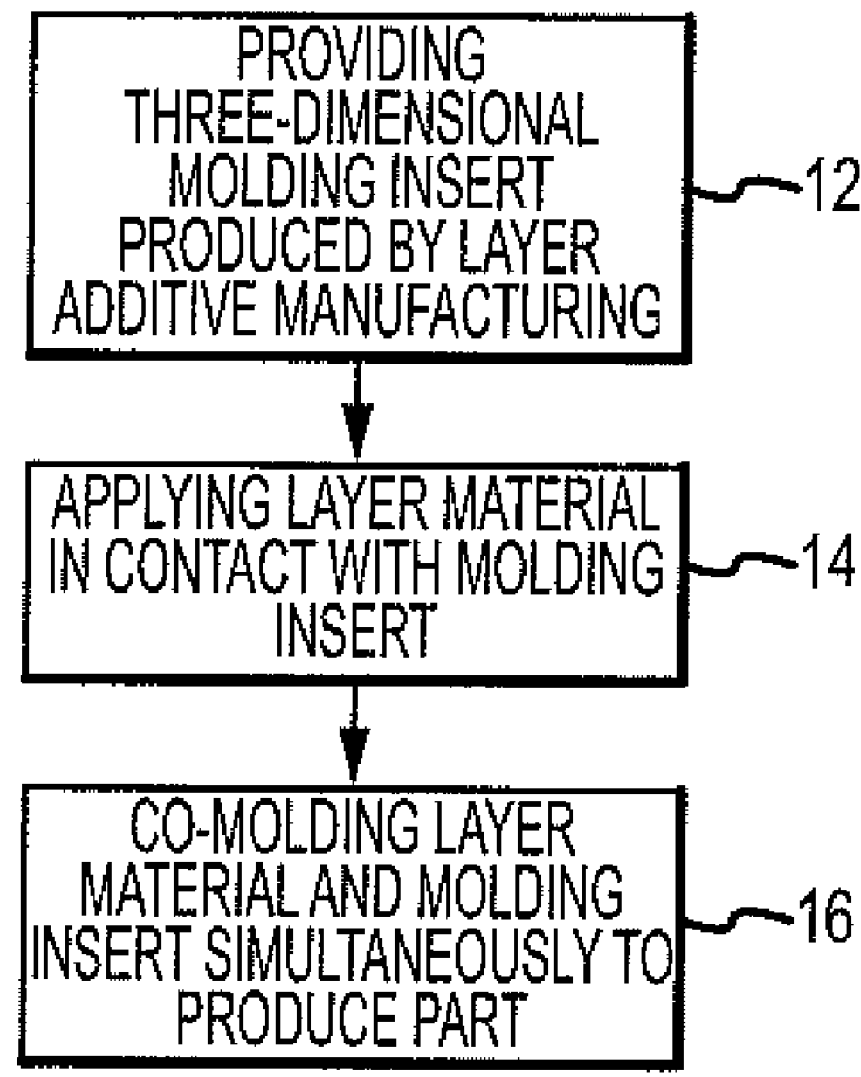
FIG. 1 is a block flow diagram of one of the embodiments of the method for manufacturing co-molded inserts of the disclosure.

Referring more particularly to the drawings, FIG. 1 shows a block flow diagram of one of the embodiments of a method 10 for manufacturing co-molded inserts. The exemplary method comprises step 12 of providing a three-dimensional molding insert or insert test part (see for example, FIG. 5, part 70) produced by layer additive manufacturing (AM). Preferably, the three-dimensional molding insert or insert test part is modeled after a three-dimensional concept rendering or representation of the molding insert or insert test part (see for example, FIG. 3, part 50) that is preferably designed with three-dimensional CAD (computer aided design) software. The method preferably uses additive manufacturing (AM) to build the molding insert or insert test part layer-wise additively from the three-dimensional CAD designed concept rendering or representation of the molding insert or insert test part. An AM machine, during the build process, adds layers efficiently such that there is little waste or reduction of materials and produces parts with acceptable accuracy and good surface finish. AM technology may comprise such methods and devices as selective laser sintering (SLS), fused deposition modeling (FDM), stereolithography, three-dimensional printing (3DP), or other suitable AM manufacturing methods and devices. The AM methods and devices used with the disclosed method require little or no tooling, fixturing, or molding and can build not just one insert but multiple inserts co-located via very thin, fine connecting geometry. The AM methods and devices create or build the molding insert or insert test parts in useful materials. The molding insert or insert test part may be comprised of a composite material, such as a reinforced polymer and/or a non-reinforced polymer, and the molding insert may be used in fabricating a high stiffness, thin-walled, component part. The molding insert or insert test part may further be comprised of titanium alloys, thermoplastics, thermoset plastics, steel, aluminum, or other suitable materials.

The method further comprises step 14 of applying a layer material (see for example, FIG. 6, part 80) in contact with at least a portion of the molding insert or insert test part. The layer material may comprise a reinforced thermoplastic laminate, a fiber reinforced plastic, dry carbon fiber, pre-impregnated carbon fiber fabric, thermoset resin, thermoplastic, fabric, fiberglass, plastics such as polyetherimide (PEI) or poly paraphenylene terephthalamide (KEVLAR), a light, strong para-aramid synthetic fiber, or a combination thereof, or another suitable material. (KEVLAR is a registered trademark of DuPont of Wilmington, Del.). The molding insert with the layer material are incorporated or inserted into a mold (see for example, FIG. 6, part 82).

Figure 8:
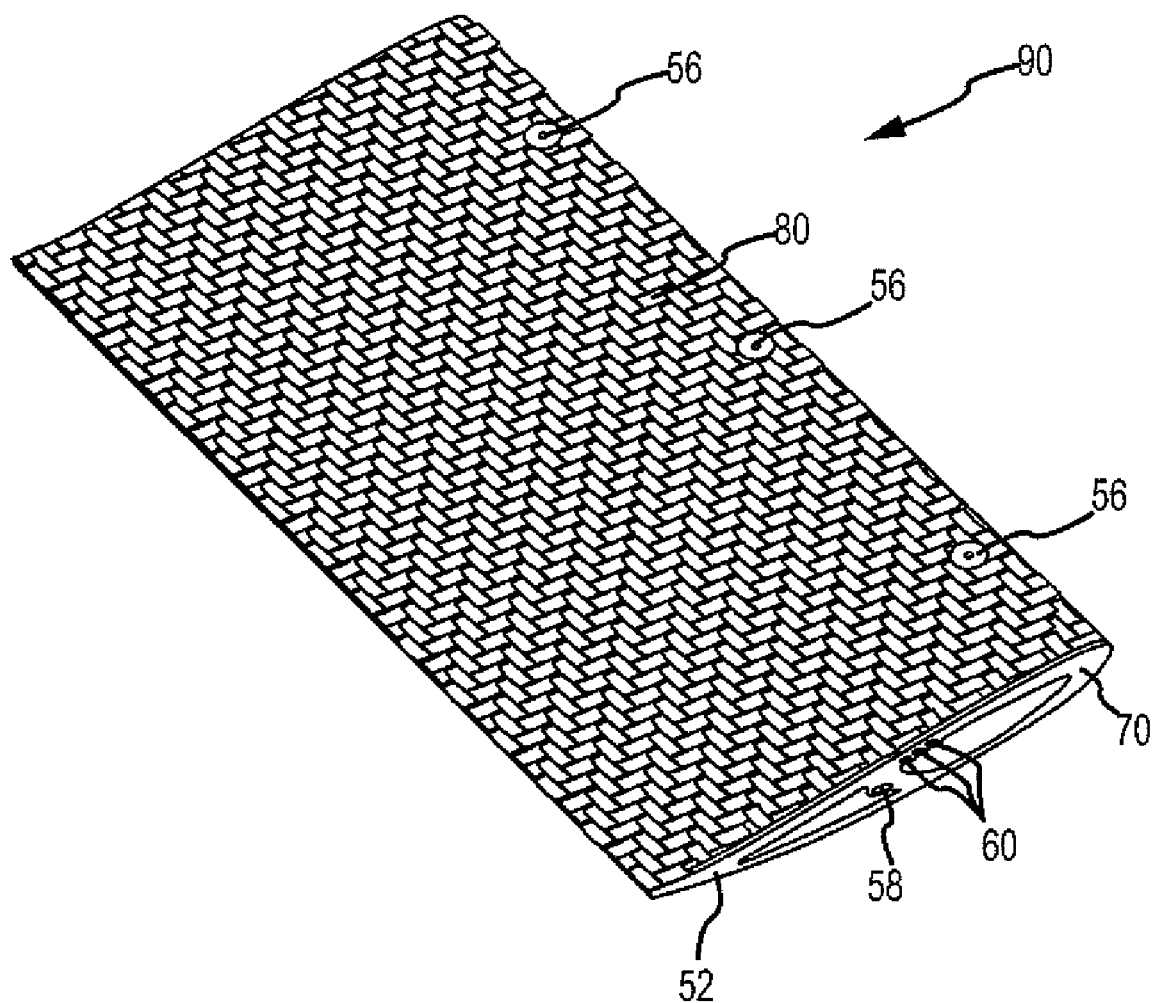

The method further comprises step 16 of co-molding the layer material and molding insert simultaneously to produce a co-molded insert part (see for example, FIG. 8, part 90). Co-molding processes may be used, such as curing, thermoforming, resin infusion, liquid molding, autoclave molding, compression molding, chemical molding, fiber reinforced plastic (FRP) molding, pressure forming, or another suitable co-molding process. Preferably, the molding insert is comprised of one or more materials that are compatible with the co-molding processes. The molding insert and the layer material are bonded together during the co-molding process to form a co-molded insert part. The co-molded insert part may then be removed from the mold and finished and processed with conventional finishing and processing techniques, such as post-machining. The method may be used in the manufacture of aerospace parts for use in aircraft, spacecraft and other craft.

Figure 2:
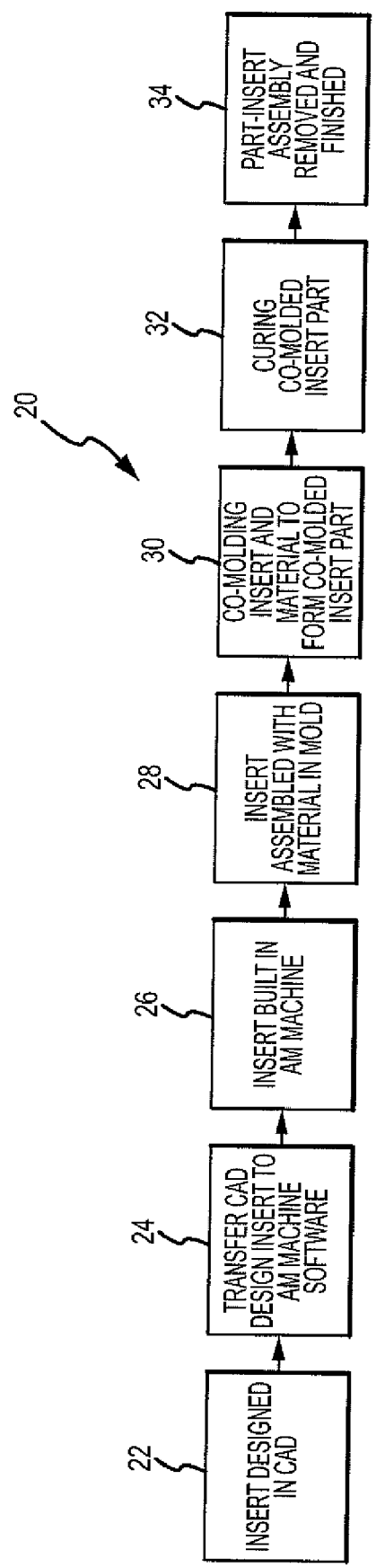
FIG. 2 is a block flow diagram of another one of the embodiments of the method for manufacturing co-molded inserts of the disclosure.

FIG. 2 shows a block flow diagram of another one of the embodiments of a method 20 for manufacturing co-molded inserts. The exemplary method 20 comprises step 22 of designing or creating an insert in CAD (computer aided design) software. The method 20 further comprises step 24 of transferring the CAD designed insert to an additive manufacture (AM) machine software. The method 20 further comprises step 26 of building an insert in an AM machine or device. The AM machine or device may comprise selective laser sintering (SLS), fused deposition modeling (FDM), stereolithography, three-dimensional printing (3DP), or another suitable machine or device. The method further comprises step 28 of assembling the insert part with a layer material in a mold. The layer material may comprise a reinforced thermoplastic laminate, a fiber reinforced plastic, dry carbon fiber, pre-impregnated carbon fiber fabric, thermoset resin, thermoplastic, fabric, fiberglass, plastics such as polyetherimide (PEI) or poly paraphenylene terephthalamide (KEVLAR), a light, strong para-aramid synthetic fiber, or a combination thereof, or another suitable material. The method further comprises step 30 of co-molding the insert and the layer material to form a co-molded insert part. The co-molding step may comprise a co-molding process, such as thermoforming, resin infusion, liquid molding, autoclave molding, compression molding, chemical molding, fiber reinforced plastic (FRP) molding, pressure forming, or another suitable co-molding process. In the co-molding process, bonding between the insert part and the layer material takes place. The method further comprises step 32 of curing the co-molded insert part. The method further comprises step 34 of removing and finishing the co-molded insert part or assembly. There is preferably no secondary bonding operations for the co-molded insert. The co-molded insert part may be used in fiber reinforced or thermoformed plastic parts, composite parts, and metal parts. The method may be used in the manufacture of aerospace parts for use in aircraft, spacecraft, and other craft.

With the disclosed embodiments of the method, multiple inserts can be assembled together, via fine connecting geometry. The method can be used to create three-dimensional composite components with co-molded inserts, thereby reducing the number of molding operations and associated tooling. The method allows for designs of higher geometric complexity to be manufactured, due to the free form nature of additive manufacturing.

Figure 3:
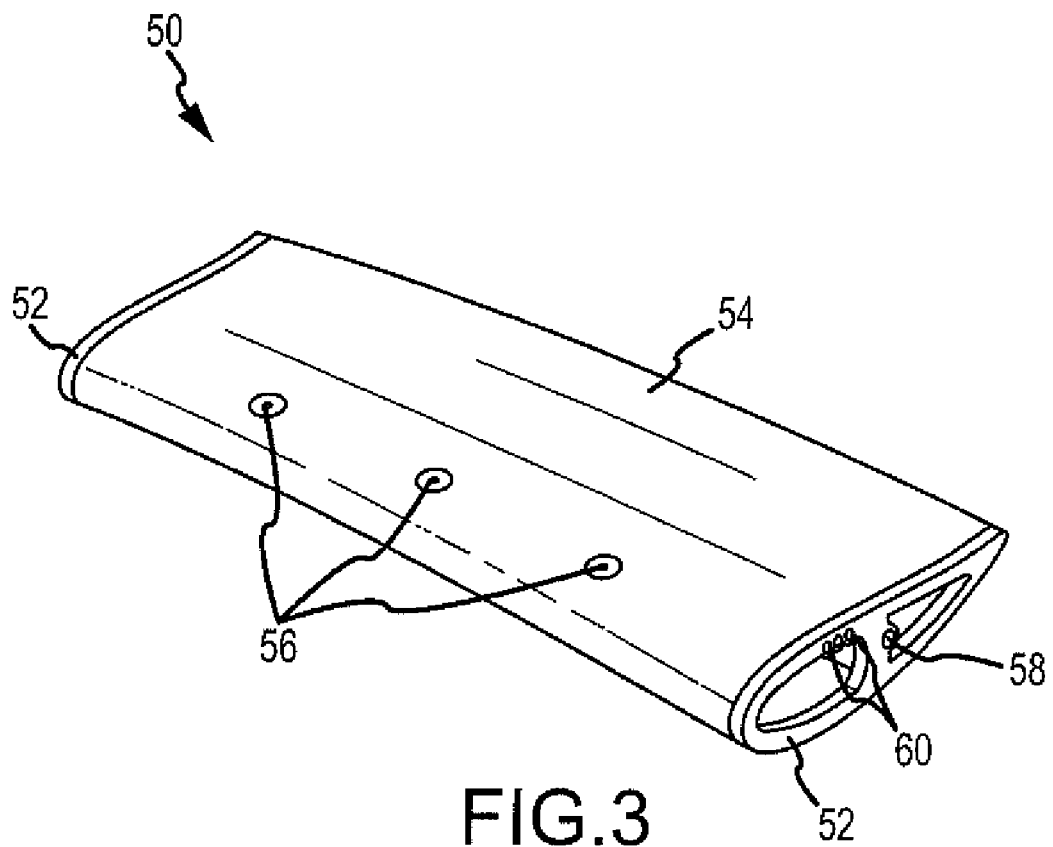
FIG. 3 is a perspective view of a CAD (computer aided design) rendering of a molding insert.
Figure 4:
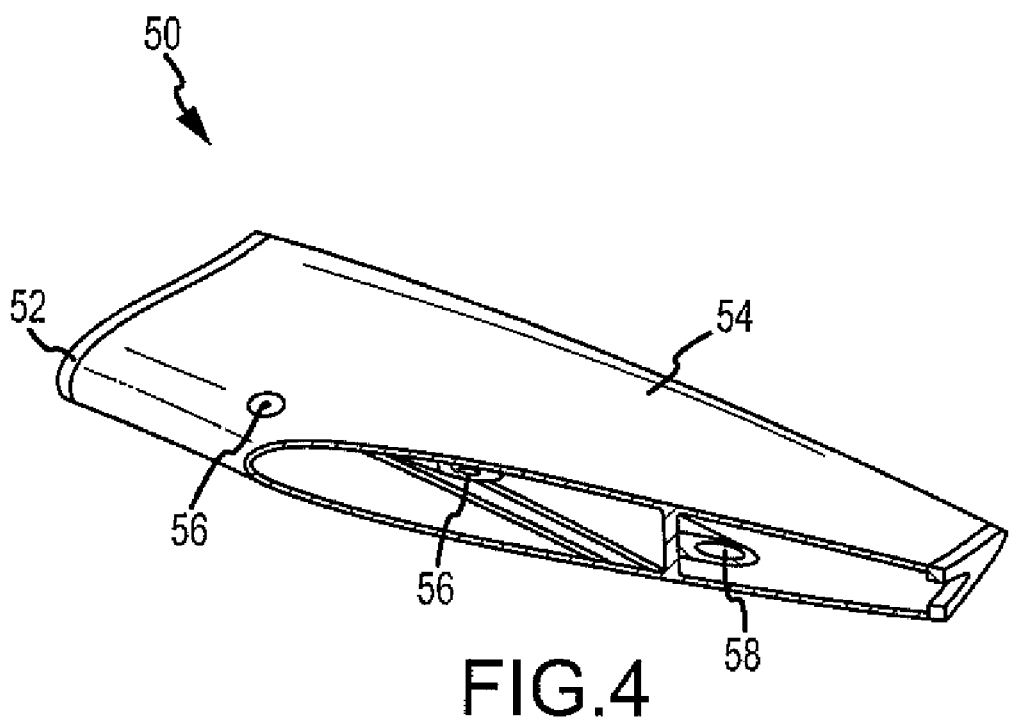
FIG. 4 is a partial cut-away view of the molding insert of FIG. 3.
Figure 5:
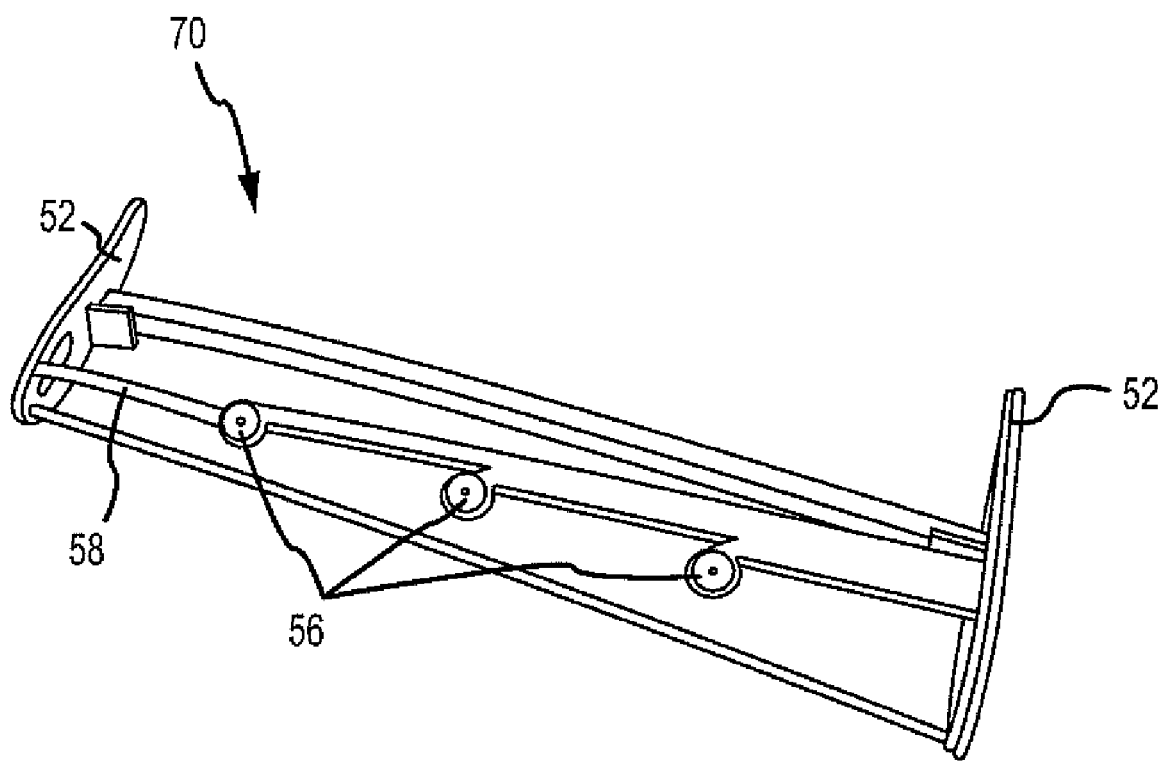
FIG. 5 is a perspective view of a prototype additive manufactured molding insert.

FIGS. 3-8 show an example of the molding insert at various stages of the disclosed embodiments of the method discussed above. FIG. 3 is a perspective view of a CAD concept rendering or representation of an airfoil molding insert or insert test part 50. The CAD representation of the airfoil molding insert 50 integrates ribs 52, skin 54, pressure tap inlets 56, a fluid duct 58, and pressure tap outlets 60, as a single insert to be produced by an AM machine or method. FIG. 4 is a partial cut-away view of the CAD designed insert test part 50 of FIG. 3. FIG. 4 shows the pressure tap inlet 56 cut-away and the fluid duct 58 cut-away, both in the form of tubes. FIG. 5 is a perspective view of a prototype additive manufactured molding insert or insert test part 70. Preferably, the molding insert or insert test part is made of useful materials, such as titanium alloys, thermoplastics, thermoset plastics, steel, aluminum, or other suitable materials. For example, the AM molding insert may be made of steel at a length of about 175 mm (millimeters) using an MCP Hek Realizer AM machine obtained from MCP Hek of Germany. The prototype molding insert 70 incorporates ribs 52, pressure tap inlets 56, fluid duct 58, and pressure tap outlets 60 (not shown in FIG. 5 but see FIG. 3), showing multi-insert integration.

Figure 6:
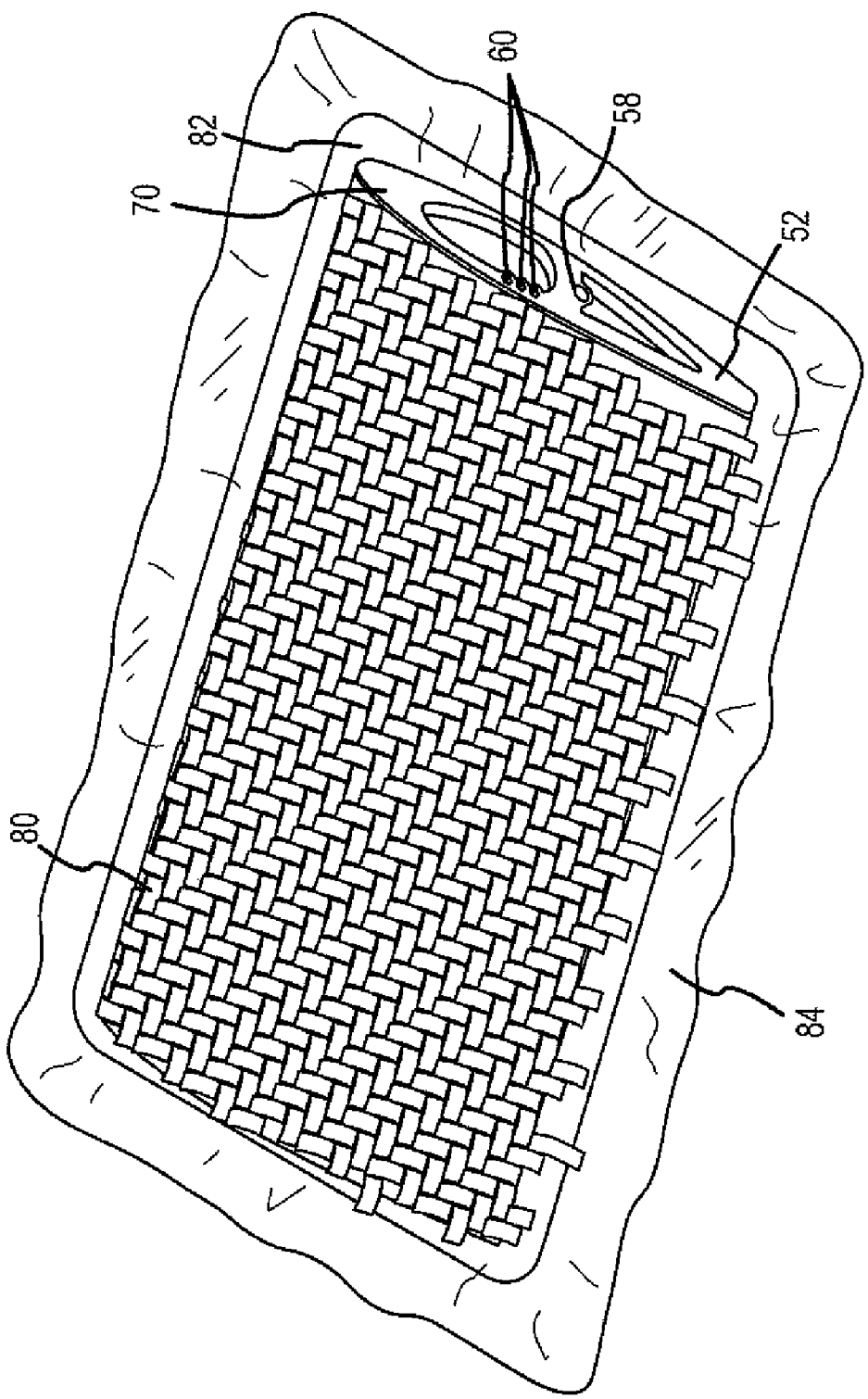
FIG. 6 is a perspective view of an additive manufactured insert covered with a layer material and inserted into a mold.

FIG. 6 is a perspective view of the prototype additive manufactured molding insert or insert test part 70 covered with a layer material 80 and inserted or assembled into a mold 82 prior to the co-molding process. The molding insert 70 shows rib 52, fluid duct 58, and pressure tap outlets 60. The layer material may comprise a reinforced thermoplastic laminate, a fiber reinforced plastic, dry carbon fiber, pre-impregnated carbon fiber fabric, thermoset resin, thermoplastic, fabric, fiberglass, plastics such as polyetherimide (PEI) or poly paraphenylene terephthalamide (KEVLAR), a light, strong para-aramid synthetic fiber, or a combination thereof, or another suitable material. The molding insert covered with the layer material and inserted into the mold may be placed on or in a bagging element 84. The bagging element may comprise a flexible plastic bag, a release film, a sheet of plastic, a vacuum folding, or another suitable material. The molding insert is preferably built with an AM machine and process, as discussed above, and then the molding insert with the layer material is inserted or placed into the mold. The molding insert and the mold may then be co-molded simultaneously.

Figure 7:
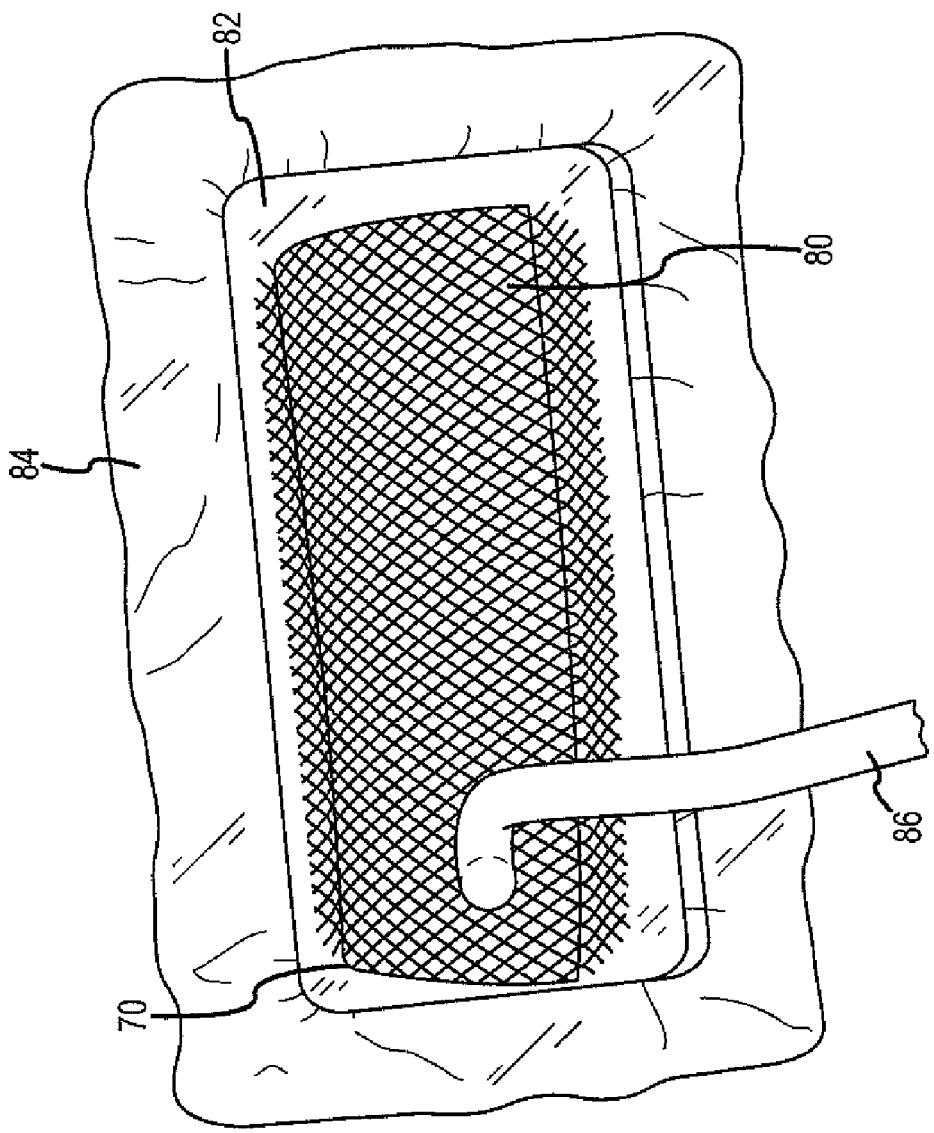
FIG. 7 is perspective view of the molding insert in the mold of FIG. 6 in a closed and bagged stage; and, FIG. 8 is a perspective view of a completed co-molded insert part.

FIG. 7 is perspective view of the insert 70 in the mold 82 and in the bagging element 84 of FIG. 6 in a closed and bagged stage. The closed and bagged molding insert and mold are shown in a molding process, and in particular, a resin infusion molding process with a resin tube 86 attached to and through the bagging element 84. The bagging element 84 is preferably closed down over the assembly of layer material 80 or carbon fiber on the molding insert 70, and the bagging element 84 may include a vacuum element (not shown). The vacuum element can pull resin into contact with the layer material and the molding insert through the resin tube 86 attached to and through the bagging element 84. Other suitable co-molding processes may also be used, such as curing, thermoforming, liquid molding, autoclave molding, compression molding, chemical molding, fiber reinforced plastic (FRP) molding, pressure fanning, or another co-molding process. Preferably, the molding process is conducted at ambient temperature.

FIG. 8 is a perspective view of a completed airfoil co-molded insert part 90. Molding insert 70 is covered with the layer material 80 or carbon fiber and shows rib 52, pressure tap inlets 56, fluid duct 58, and pressure tap outlets 60. The three-dimensional carbon fiber airfoil with AM insert can be co-molded in a single operation. The co-molded inserts may be used in composite, plastic, and metal parts for building spacecraft, aircraft, military craft, automobiles, watercraft, and other vehicles and craft.

In another disclosed embodiment, a method of manufacturing composite parts having co-molded inserts is provided. Three-dimensional computer aided design software is transferred to additive manufacturing machine software. Processed geometry data and a molding insert producing device forms in a layer-wise fashion, followed by post-processing and inserting the molding insert into a mold. The composite parts may be aerospace parts used in aircraft and spacecraft. The molding insert producing device preferably comprises an additive manufacturing machine and process as discussed above.

The method allows for co-molded inserts to be created in useful materials in complex geometries with little or no associated tooling cost or lead time. The use of co-molded inserts reduces the required labor time for part manufacturing and allows for more advanced, three-dimensional designs to be created with higher precision. It is estimated that significant performance gains can be made through the use of co-molded inserts made with the disclosed method. Such an improvement of mechanical performance can lead to cost reductions through, for example, lower material usage.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting. Although specific terms are employed herein, they are used in a generic and descriptive sense only and not for purposes of limitation.

What is claimed is:

1. A method of manufacturing a co-molded insert part comprising the steps of:
   providing a three-dimensional molding insert produced by a layer additive manufacturing process, wherein the three-dimensional molding insert integrates one or more of ribs, skin, pressure tap inlets, fluid ducts, pressure tap outlets, and tubes;
   covering the molding insert with a layer material;
   inserting the molding insert covered with the layer material into a mold; and,
   co-molding the layer material and the molding insert simultaneously to produce a co-molded insert part, wherein the one or more of ribs, skin, pressure tap inlets, fluid ducts, pressure tap outlets, and tubes are integrated through an exterior of the co-molded insert part.

2. The method of claim 1, wherein the molding insert and the layer material are bonded in the co-molding step.

3. The method of claim 1, wherein the layer additive manufacturing process is selected from the group comprising selective laser sintering (SLS), fused deposition modeling (FDM), stereolithography, and three-dimensional printing (3DP).

4. The method of claim 1, wherein the molding insert is comprised of a composite material including a polymer.

5. The method of claim 4, wherein the polymer is one of reinforced and non-reinforced.

6. The method of claim 5, wherein the molding insert is used in fabricating a high stiffness, thin-walled, component part.

7. The method of claim 1, wherein the molding insert is comprised of one or more materials that are compatible with a co-molding process.

8. The method of claim 1, wherein the co-molding step includes a co-molding process selected from the group comprising curing, thermoforming, resin infusion, autoclave molding, compression molding, chemical molding, fiber reinforced plastic (FRP) molding, and pressure forming.

9. The method of claim 1, wherein the layer material is selected from the group consisting of a reinforced thermoplastic laminate, a fiber reinforced plastic, dry carbon fiber, pre-impregnated carbon fiber fabric, thermoset resin, thermoplastic, fabric, fiberglass, polyetherimide (PEI), poly paraphenylene terephthalamide, a light, strong para-aramid synthetic fiber, or a combination thereof.

10. A method for additive manufacturing of a co-molded insert part comprising the steps of:
    creating with a computer aided design software a three-dimensional computer rendering of an insert part, wherein the insert part integrates one or more of ribs, skin, pressure tap inlets, fluid ducts, pressure tap outlets, and tubes;
    transferring the computer rendered insert part to an additive manufacturing machine software to build the insert part;
    building the insert part with an additive manufacturing process;
    covering the insert part with a layer material;
    assembling the insert part covered with the layer material in a mold;
    co-molding the insert part and the material in the mold to form a co-molded insert part, wherein the one or more of ribs, skin, pressure tap inlets, fluid ducts, pressure tap outlets, and tubes are integrated through an exterior of the co-molded insert part;
    curing the co-molded insert part;
    removing the co-molded insert part from the mold; and,
    finishing and post-processing the co-molded insert part.

11. The method of claim 10 wherein the additive manufacturing process is selected from the group comprising selective laser sintering (SLS), fused deposition modeling (FDM), stereolithography, and three-dimensional printing (3DP).

12. The method of claim 10 wherein the layer material is selected from the group consisting of a reinforced thermoplastic laminate, a fiber reinforced plastic, dry carbon fiber, pre-impregnated carbon fiber fabric, thermoset resin, thermoplastic, fabric, fiberglass, polyetherimide (PEI), poly paraphenylene terephthalamide, a light, strong para-aramid synthetic fiber, or a combination thereof.

13. The method of claim 10 wherein the co-molded insert part is used in fiber reinforced or thermoformed plastic parts.

14. The method of claim 10 wherein the co-molding step includes a co-molding process selected from the group comprising thermoforming, resin infusion, autoclave molding, compression molding, chemical molding, fiber reinforced plastic (FRP) molding, and pressure forming.

15. The method of claim 10 wherein the insert part and layer material are bonded in the co-molding step.

16. A method of manufacturing composite parts having co-molded inserts, wherein three-dimensional computer aided design software is transferred to additive manufacturing machine software, and further wherein processed geometry data and a molding insert producing device forms the molding insert in a layer-wise fashion, followed by covering the molding insert with a layer material, post-processing and inserting the molding insert covered with the layer material into a mold, and co-molding the molding insert and the layer material in the mold to form a co-molded molding insert, wherein the molding insert integrates through an exterior of the co-molded molding insert one or more of ribs, skin, pressure tap inlets, fluid ducts, pressure tap outlets, and tubes.

17. The method of claim 16 wherein the composite parts are aerospace parts used in aircraft and spacecraft.

18. The method of claim 16 wherein the molding insert producing device comprises an additive manufacturing machine.

* * * * *